United States Patent
Kumar et al.

(10) Patent No.: US 11,365,785 B2
(45) Date of Patent: Jun. 21, 2022

(54) ELECTRIC AXLE TRANSMISSION FOR ELECTRIC AND HYBRID ELECTRIC VEHICLES

(71) Applicant: Dana Heavy Vehicle Systems Group, LLC, Maumee, OH (US)

(72) Inventors: Krishna Kumar, Holland, OH (US); William F. Waltz, Toledo, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 201 days.

(21) Appl. No.: 16/465,295

(22) PCT Filed: Nov. 30, 2017

(86) PCT No.: PCT/US2017/063852
§ 371 (c)(1),
(2) Date: May 30, 2019

(87) PCT Pub. No.: WO2018/102498
PCT Pub. Date: Jun. 7, 2018

(65) Prior Publication Data
US 2019/0344660 A1      Nov. 14, 2019

Related U.S. Application Data

(60) Provisional application No. 62/452,714, filed on Jan. 31, 2017, provisional application No. 62/434,015,
(Continued)

(51) Int. Cl.
*F16H 1/46* (2006.01)
*B60K 1/00* (2006.01)
(Continued)

(52) U.S. Cl.
CPC ............... *F16H 1/46* (2013.01); *B60K 1/00* (2013.01); *B60K 17/02* (2013.01); *F16H 3/44* (2013.01);
(Continued)

(58) Field of Classification Search
CPC ... F16H 1/46; F16H 3/44; F16H 57/10; F16H 2200/0039; F16H 2200/2007;
(Continued)

(56) References Cited

U.S. PATENT DOCUMENTS 6,269,895 B1 *  8/2001  Tanuguchi ............ B60W 10/08
                                                        180/65.25
6,524,217 B1 *  2/2003  Murakami ............. B60K 6/365
                                                          477/5

(Continued)

OTHER PUBLICATIONS

International Searching Authority/United States, International Search Report and Written Opinion in Application PCT/US2017/063852, dated Mar. 29, 2019, 21 pages, Alexandria, Virginia, United States.
(Continued)

*Primary Examiner* — Paul N Dickson
*Assistant Examiner* — Timothy Wilhelm
(74) *Attorney, Agent, or Firm* — McCoy Russell LLP (57) ABSTRACT

An electric axle having an electric drivetrain including a motor/generator, a first planetary gear set operably coupled to the motor/generator, and a second planetary gear set operably coupled to the first planetary gear set, wherein the first planetary gear set includes a first ring gear, a first planet carrier, and a first sun gear, and wherein the second planetary gear set includes a second ring gear, a second planet carrier, and a second sun gear; a drive wheel axle operably coupled to the electric drivetrain; and a first wheel and a second wheel coupled to the drive wheel axle.

14 Claims, 6 Drawing Sheets

Related U.S. Application Data filed on Dec. 14, 2016, provisional application No. 62/428,127, filed on Nov. 30, 2016.

(51) Int. Cl.

| | | |
|---|---|---|
| *B60K 17/02* | (2006.01) | |
| *F16H 3/44* | (2006.01) | |
| *F16H 57/10* | (2006.01) | |
| *B60K 1/02* | (2006.01) | |
| *B60K 6/365* | (2007.10) | |

(52) U.S. Cl.
CPC ............... *F16H 57/10* (2013.01); *B60K 1/02* (2013.01); *B60K 6/365* (2013.01); *F16H 2200/0039* (2013.01); *F16H 2200/201* (2013.01); *F16H 2200/2007* (2013.01)

(58) Field of Classification Search
CPC ....... F16H 2200/201; F16H 2200/2005; F16H 2200/2035; F16H 2200/0034; F16H 2200/0021; B60K 1/00; B60K 17/02; B60K 1/02; B60K 6/365; B60K 2001/001; B60K 2007/0061; B60K 17/04; B60K 7/007; B60K 17/06; Y02T 10/72
See application file for complete search history.

(56) References Cited

U.S. PATENT DOCUMENTS

| | | | | |
|---|---|---|---|---|
| 6,549,840 | B1* | 4/2003 | Mikami | B60W 10/06 |
| | | | | 701/69 |
| 6,615,940 | B2* | 9/2003 | Morisawa | B60K 6/543 |
| | | | | 180/65.1 |
| 6,634,247 | B2* | 10/2003 | Pels | B60W 10/02 |
| | | | | 74/329 |
| 6,691,809 | B2* | 2/2004 | Hata | B60W 10/26 |
| | | | | 180/65.225 |
| 6,716,126 | B2* | 4/2004 | Bowen | B60K 6/383 |
| | | | | 475/5 |
| 7,108,626 | B2* | 9/2006 | Friedmann | B60K 6/40 |
| | | | | 475/8 |
| 7,282,008 | B2* | 10/2007 | Oshidari | B60K 6/365 |
| | | | | 477/4 |
| 7,395,889 | B2* | 7/2008 | Sugiyama | B60L 50/61 |
| | | | | 180/65.285 |
| 7,479,082 | B2* | 1/2009 | Usoro | B60K 6/445 |
| | | | | 475/5 |
| 7,490,685 | B2* | 2/2009 | Aoki | B60W 10/08 |
| | | | | 180/65.28 |
| 7,575,529 | B2* | 8/2009 | Holmes | B60K 6/48 |
| | | | | 475/5 |
| 7,753,818 | B2* | 7/2010 | Kamada | B60W 30/20 |
| | | | | 475/153 |
| 8,187,130 | B1 | 5/2012 | Mellet et al. | |
| 8,297,141 | B2* | 10/2012 | Cimatti | F16H 61/0028 |
| | | | | 74/330 |
| 8,337,352 | B2* | 12/2012 | Morrow | F16H 37/065 |
| | | | | 475/5 |
| 8,424,622 | B2* | 4/2013 | Ideshio | B60L 50/61 |
| | | | | 180/65.225 |
| 8,540,602 | B2 | 9/2013 | Ishikawa | |
| 8,597,146 | B2 | 12/2013 | Holmes | |
| 8,622,862 | B2* | 1/2014 | Koyama | B60L 15/20 |
| | | | | 475/5 |
| 8,684,885 | B2* | 4/2014 | Ichikawa | B60K 6/543 |
| | | | | 477/6 |
| 8,757,306 | B2* | 6/2014 | Kobayashi | B60W 20/40 |
| | | | | 180/65.265 |
| 8,795,113 | B2 | 8/2014 | Grochowski | |
| 8,858,376 | B2* | 10/2014 | Hart | B60K 6/48 |
| | | | | 475/5 |
| 8,915,822 | B2* | 12/2014 | Ichikawa | B60K 17/08 |
| | | | | 477/6 |
| 8,979,694 | B2* | 3/2015 | Holmes | B60W 20/30 |
| | | | | 475/5 |
| 9,008,927 | B2* | 4/2015 | Iwase | B60W 30/20 |
| | | | | 701/54 |
| 9,067,584 | B2* | 6/2015 | Yaguchi | B60W 50/08 |
| 9,114,699 | B2* | 8/2015 | Takei | B60K 6/48 |
| 9,150,092 | B2* | 10/2015 | Murakami | H02K 16/02 |
| 9,156,344 | B2* | 10/2015 | Tiwari | F16H 3/725 |
| 9,340,100 | B2* | 5/2016 | Park | B60K 6/442 |
| 9,381,801 | B2* | 7/2016 | Sugimura | B60K 6/54 |
| 9,469,294 | B2* | 10/2016 | Takahashi | B60L 58/12 |
| 9,568,082 | B2* | 2/2017 | Yang | B60K 6/387 |
| 9,604,529 | B2* | 3/2017 | Choi | B60K 6/365 |
| 9,643,481 | B2* | 5/2017 | Goleski | B60K 6/442 |
| 9,650,032 | B2* | 5/2017 | Kotloski | B60W 10/08 |
| 9,651,120 | B2* | 5/2017 | Morrow | F16H 3/727 |
| 9,656,659 | B2* | 5/2017 | Shukla | B60K 6/365 |
| 9,669,819 | B2* | 6/2017 | Saito | B60K 6/445 |
| 9,765,869 | B2* | 9/2017 | Holmes | F16H 37/021 |
| 9,950,607 | B2* | 4/2018 | Littlefield | F16H 37/02 |
| 10,065,640 | B2* | 9/2018 | Yang | B60W 10/06 |
| 10,066,718 | B2* | 9/2018 | Imamura | B60K 17/02 |
| 10,144,406 | B2* | 12/2018 | Ishikawa | B60K 6/445 |
| 10,166,966 | B2* | 1/2019 | Dufford | B60W 10/06 |
| 10,214,092 | B2* | 2/2019 | Yang | B60K 6/445 |
| 10,214,196 | B2* | 2/2019 | Hotta | B60W 50/0097 |
| 10,293,811 | B2* | 5/2019 | Tsukizaki | B60K 6/38 |
| 10,300,905 | B2* | 5/2019 | Holmes | F16H 61/702 |
| 10,421,350 | B2* | 9/2019 | Morrow | F16H 3/728 |
| 10,434,862 | B2* | 10/2019 | Hwang | B60K 6/365 |
| 10,569,635 | B2* | 2/2020 | Duan | F16H 3/725 |
| 10,569,636 | B1* | 2/2020 | Park | B60K 6/365 |
| 10,584,775 | B2* | 3/2020 | Steinberger | B60K 6/442 |
| 10,661,783 | B2* | 5/2020 | Lindstrom | F16H 37/042 |
| 10,704,652 | B2* | 7/2020 | Jang | F16H 37/0833 |
| 10,760,662 | B2* | 9/2020 | Lian | B60K 6/48 |
| 10,781,890 | B2* | 9/2020 | Lian | B60K 7/0007 |
| 10,788,110 | B2* | 9/2020 | Katsura | F16H 37/022 |
| 10,800,248 | B2* | 10/2020 | Ruan | F16H 3/093 |
| 10,807,466 | B1* | 10/2020 | Haka | B60K 1/04 |
| 10,850,599 | B2* | 12/2020 | Lian | B60K 6/36 |
| 10,913,341 | B2* | 2/2021 | Cho | B60K 6/547 |
| 10,940,750 | B2* | 3/2021 | Pan | B60K 6/543 |
| 10,982,736 | B2* | 4/2021 | Steinberger | B60K 17/28 |
| 2002/0045507 | A1* | 4/2002 | Bowen | F16H 3/727 |
| | | | | 475/5 |
| 2002/0088291 | A1* | 7/2002 | Bowen | B60W 10/113 |
| | | | | 74/339 |
| 2002/0177504 | A1* | 11/2002 | Pels | B60K 6/387 |
| | | | | 477/3 |
| 2003/0075368 | A1* | 4/2003 | Takaoka | B60K 6/46 |
| | | | | 180/65.235 |
| 2003/0199353 | A1* | 10/2003 | Bowen | B60K 6/365 |
| | | | | 475/5 |
| 2006/0289212 | A1* | 12/2006 | Haruhisa | B60W 20/13 |
| | | | | 180/65.235 |
| 2008/0248911 | A1* | 10/2008 | Hart | F16H 3/666 |
| | | | | 475/276 |
| 2011/0160015 | A1* | 6/2011 | Ren | B60K 6/547 |
| | | | | 475/5 |
| 2012/0116622 | A1 | 5/2012 | Kim | |
| 2012/0178578 | A1 | 7/2012 | Mellet | |
| 2013/0158760 | A1 | 6/2013 | Kim | |
| 2014/0123806 | A1* | 5/2014 | Lee | B60K 6/547 |
| | | | | 74/661 |
| 2014/0235394 | A1* | 8/2014 | Smetana | B60W 10/115 |
| | | | | 475/151 |
| 2014/0257653 | A1* | 9/2014 | Sato | B60W 20/10 |
| | | | | 701/55 |
| 2014/0287869 | A1* | 9/2014 | Kato | B60K 6/547 |
| | | | | 477/3 |
| 2014/0296027 | A1* | 10/2014 | Takahashi | B60W 30/18109 |
| | | | | 477/5 |
| 2015/0006065 | A1* | 1/2015 | Yamamoto | F02D 29/02 |
| | | | | 701/113 |
| 2015/0167794 | A1* | 6/2015 | Morio | B60K 6/48 |
| | | | | 475/5 |
| 2015/0276022 | A1 | 10/2015 | Lichtenegger | |

(56) References Cited

U.S. PATENT DOCUMENTS

| | | | |
|---|---|---|---|
| 2015/0292600 A1* | 10/2015 | Al .................... | B60W 10/11 475/5 |
| 2016/0101680 A1* | 4/2016 | Ahn ................. | B60K 6/365 475/5 |
| 2016/0280057 A1* | 9/2016 | Kang ................ | B60K 6/387 |
| 2016/0339777 A1* | 11/2016 | Goleski ............. | B60K 6/547 |
| 2017/0136870 A1* | 5/2017 | Littlefield .......... | B60K 17/356 |
| 2017/0259809 A1* | 9/2017 | Sakamoto ......... | B60W 20/20 |
| 2018/0208044 A1* | 7/2018 | Imamura ........... | B60W 10/08 |
| 2018/0257478 A1* | 9/2018 | Haka ................. | B60K 6/445 |
| 2018/0264927 A1* | 9/2018 | Komada ............ | B60K 6/387 |
| 2018/0326834 A1* | 11/2018 | Kumar ............... | B60K 6/445 |
| 2018/0372200 A1* | 12/2018 | Kumar ............... | B60K 6/36 |
| 2019/0184809 A1* | 6/2019 | David ................ | B60K 6/387 |
| 2019/0291568 A1* | 9/2019 | Lian .................. | B60K 1/00 |
| 2019/0308497 A1* | 10/2019 | Lian .................. | F16H 37/046 |
| 2020/0023733 A1* | 1/2020 | Lian .................. | B60K 6/547 |
| 2021/0023931 A1* | 1/2021 | Hwang .............. | F16H 3/085 |

OTHER PUBLICATIONS

Intellectual Property Office of India, Examination Report Issued in Application No. 201917017652, dated Jun. 7, 2020, Mumbai, 6 pages.

\* cited by examiner

|  | Brake | One-way clutch | CL1 | CL2 | M/G | M/G2 |
|---|---|---|---|---|---|---|
| Low | X | 0 | X | 0 | F↑ | F↑ |
| Shift sequence |  |  |  |  |  |  |
| M2 disengage | X | 0 | X | 0 | F↑ | F↓ |
| Clutch change | X | 0 | 0 | X | F↑ | 0 |
| M2 engage | 0 | 0 | 0 | X | F↓ | F↑ |
| High | 0 | X | 0 | X | 0 | F↑ |
| High Spd & Torq | 0 | 0 | 0 | X | F↑ | F↑ |
| Rev | 0 | 0 | 0 | X | F↑ | R↑ |

ELECTRIC AXLE TRANSMISSION FOR ELECTRIC AND HYBRID ELECTRIC VEHICLES

RELATED APPLICATIONS

The present application claims the benefit of U.S. Provisional Application No. 62/428,127 filed on Nov. 30, 2016, U.S. Provisional Application No. 62/434,015 filed on Dec. 14, 2016, and U.S. Provisional Application No. 62/452,714 filed on Jan. 31, 2017, which are incorporated herein by reference in its entirety.

BACKGROUND

Hybrid vehicles are enjoying increased popularity and acceptance due in large part to the cost of fuel and greenhouse carbon emission government regulations for internal combustion engine vehicles. Such hybrid vehicles include both an internal combustion engine as well as an electric motor to propel the vehicle.

In current electric axle designs for both consuming as well as storing electrical energy, the rotary shaft from a combination electric motor/generator is coupled by a gear train, planetary gear set, to the wheel. As such, the rotary shaft for the electric motor/generator unit rotates in unison with the wheel based on the speed ratio of the gear train.

These fixed ratio designs have many disadvantages, for example, the electric motor/generator unit achieves its most efficient operation, both in the sense of generating electricity and also providing additional power to the wheel or the main shaft of the internal combustion engine, only within a relatively narrow range of revolutions per minute of the motor/generator unit. As such, the overall electric or hybrid electric vehicle operates at less than optimal efficiency over a drive cycle. Therefore, there is a need for powertrain configurations that improve the efficiency of electric and hybrid electric vehicles.

SUMMARY

Provided herein is an electric axle powertrain including: an electric drivetrain including a motor/generator, a first planetary gear set operably coupled to the motor/generator, and a second planetary gear set operably coupled to the first planetary gear set, wherein the first planetary gear set includes a first ring gear, a first planet carrier, and a first sun gear and wherein the second planetary gear set includes a second ring gear, a second planet carrier, and a second sun gear; a drive wheel axle operably coupled to the electric drivetrain; and a first wheel and a second wheel coupled to the drive wheel axle.

Provided herein is an electric axle powertrain including: an electric drivetrain including a first motor/generator, a second/motor generator, a planetary gear set operably coupled to the second motor/generator, wherein the planetary gear set includes a first ring gear, a first planet carrier, and a first sun gear; a drive wheel axle operably coupled to the electric drivetrain; and a first wheel and a second wheel coupled to the drive wheel axle.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Novel features of the preferred embodiments are set forth with particularity in the appended claims. A better understanding of the features and advantages of the preferred embodiments will be obtained by reference to the following detailed description that sets forth illustrative embodiments, in which the principles of the invention are utilized, and the accompanying drawings of which:

DETAILED DESCRIPTION OF THE PREFERRED EMBODIMENTS

The preferred embodiments will now be described with reference to the accompanying figures, wherein like numerals refer to like elements throughout. The terminology used in the descriptions below is not to be interpreted in any limited or restrictive manner simply because it is used in conjunction with detailed descriptions of certain specific embodiments. Furthermore, the embodiments include several novel features, no single one of which is solely responsible for its desirable attributes or which is essential to practicing the embodiments described.

This powertrain relates to electric powertrain configurations and architectures that will be used in hybrid vehicles. The powertrain and/or drivetrain configurations use a transmission in order to couple power sources used in a hybrid vehicle, for example, combustion engines (internal or external), motors, generators, batteries, and gearing. The powertrains disclosed herein are applicable to HEV, EV and Fuel Cell Hybrid systems. Embodiments disclosed herein are directed to hybrid vehicle architectures and/or configurations for use in electric axle or hybrid electrical vehicle drivetrain. It should be appreciated that the embodiments disclosed herein are adapted to provide hybrid modes of operation that include, but are not limited to series, parallel, series-parallel, or EV (electric vehicle) modes.

It should be noted that hydro-mechanical components such as hydromotors, pumps, accumulators, among others, are capable of being used in place of the electric machines indicated in the figures and accompanying textual description. Furthermore, it should be noted that embodiments of E-axle architectures disclosed herein could incorporate a supervisory controller that chooses the highest efficiency and/or power from motor/generator to wheel.

It should be understood that electric or hybrid electric vehicles incorporating embodiments of the hybrid architectures disclosed herein are capable of including a number of other powertrain components, such as, but not limited to, high-voltage battery pack with a battery management system or ultracapacitor, on-board charger, DC-DC converters, a variety of sensors, actuators, and controllers, among others.

For purposes of description, schematics referred to as lever diagrams are used herein. A lever diagram, also known as a lever analogy diagram, is a translational-system representation of rotating parts for a planetary gear system. In certain embodiments, a lever diagram is provided as a visual aid in describing the functions of the transmission. In a lever diagram, a compound planetary gear set is often represented by a single vertical line ("lever"). The input, output, and reaction torques are represented by horizontal forces on the lever. The lever motion, relative to the reaction point, represents direction of rotational velocities. For example, a typical planetary gear set having a ring gear, a planet carrier, and a sun gear is represented by a vertical line having nodes "R" representing the ring gear, node "S" representing the sun gear, and node "C" representing the planet carrier. It should be appreciated that any mechanical coupling is depicted on a lever diagram as a node or a solid dot. For example, a node represents two components in a drivetrain that are rigidly connected.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe the preferred embodiments, specific structures or mechanisms that link or couple the elements are typically described. However, unless otherwise specifically stated, when one of said terms is used, the term indicates that the actual linkage or coupling is capable of taking a variety of forms, which in certain instances will be readily apparent to a person of ordinary skill in the relevant technology.

Figure 1:
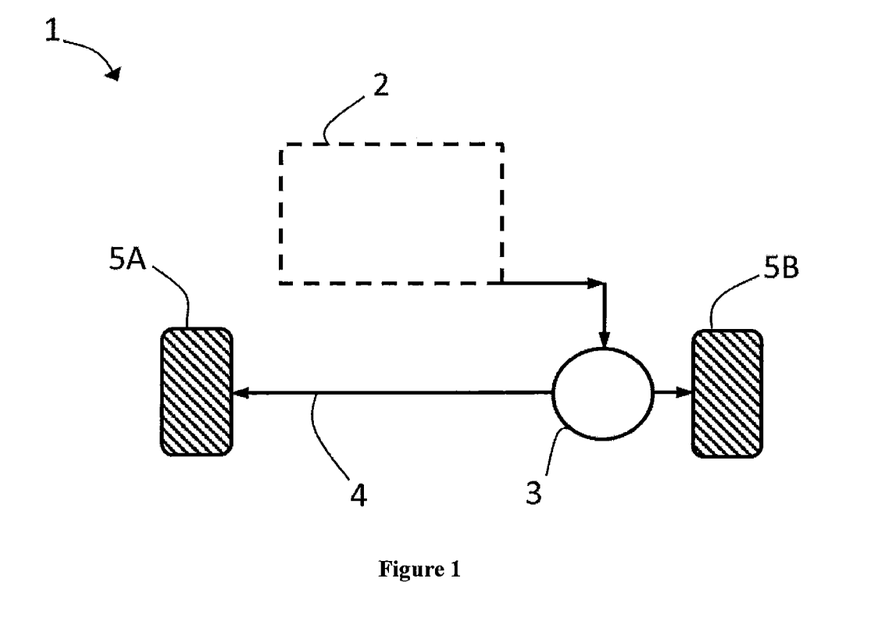
FIG. 1 is a schematic diagram of an electric axle powertrain having an electric drivetrain drivingly engaged to a differential, axle, and wheels of a vehicle.

FIG. 1 depicts one embodiment of an electric axle powertrain 1. In some embodiments, the electric axle powertrain 1 includes an electric drivetrain 2 operably coupled to a differential 3. In some embodiments, the differential 3 is a common differential gear set implemented to transmit rotational power. The differential 3 is operably coupled to a wheel drive axle 4 configured to drive a set of vehicle wheels 5 (labeled as "5A" and "5B" in FIG. 1).

Figure 2:
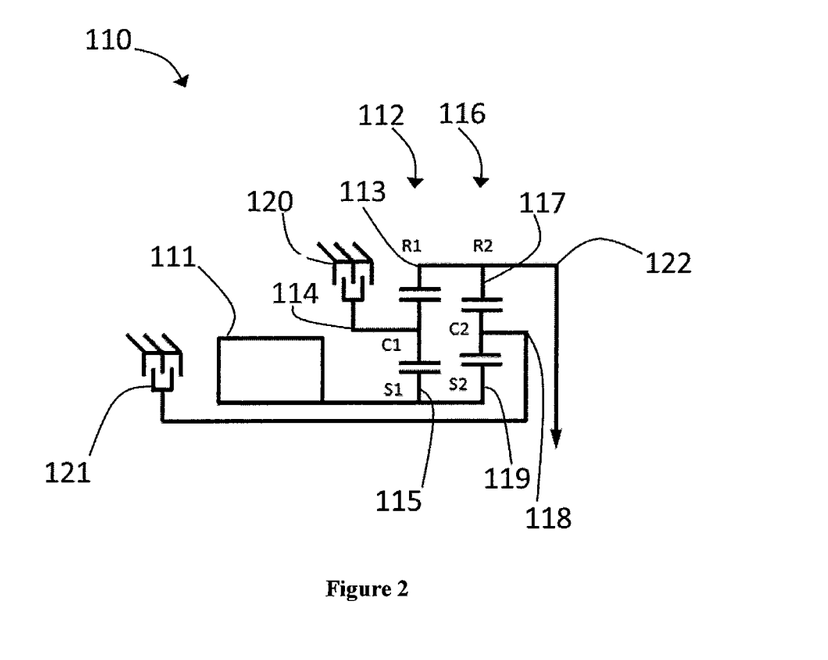
FIG. 2 is a schematic diagram of an electric drivetrain having a motor/generator, two planetary gear sets, and two brakes.

FIG. 2 depicts one embodiment of an electric drivetrain 110 optionally used in the embodiments of electric axles disclosed herein. The drivetrain 110 includes a motor/generator 111 and a first planetary gear set 112 having a first ring gear 113, a first planet carrier 114, and a first sun gear 115.

The drivetrain 110 includes a second planetary gear set 116 having a second ring gear 117, a second planet carrier 118, and a second sun gear 119. In some embodiments, the motor/generator 111 is coupled to the first sun gear 115. The first planet carrier 114 is coupled to a first brake 120. The first ring gear 113 is operably coupled to the second ring gear 117. The second planet carrier 118 is coupled to a second brake 121. The second sun gear 119 is coupled to the first sun gear 115. In some embodiments, rotational power is transmitted in and out of the drivetrain 110 through a node 122 coupled to the second ring gear 117.

Figure 3:
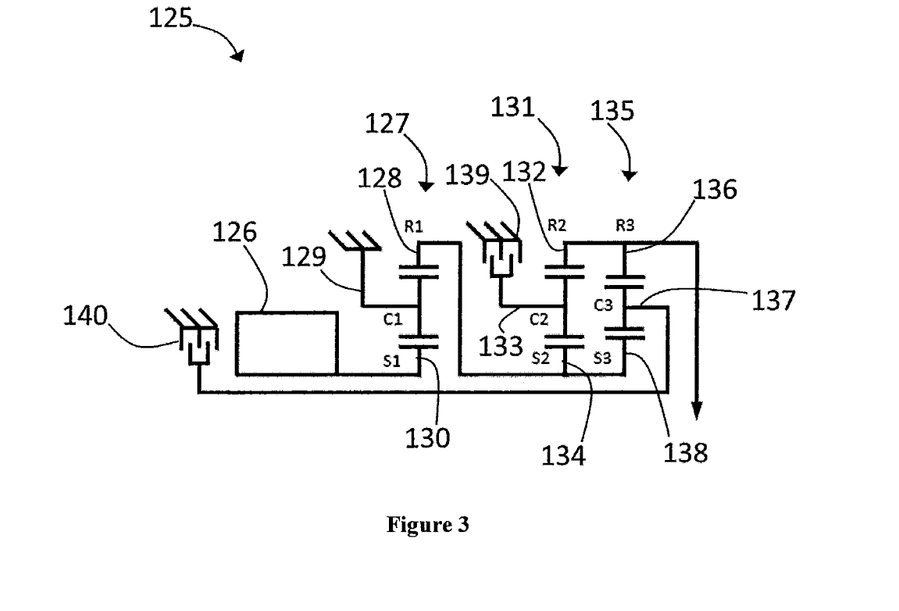
FIG. 3 is a schematic diagram of an electric drivetrain having a motor/generator, three planetary gear sets, and two brakes.

FIG. 3 depicts one embodiment of an electric drivetrain 125 optionally used in the embodiments of electric axles disclosed herein. The drivetrain 125 includes a motor/generator 126 and a first planetary gear set 127 having a first ring gear 128, a first planet carrier 129, and a first sun gear 130. The drivetrain 125 includes a second planetary gear set 131 having a second ring gear 132, a second planet carrier 133, and a second sun gear 134. The drivetrain 125 includes a third planetary gear set 135 having a third ring gear 136, a third planet carrier 137, and a third sun gear 138. In some embodiments, the motor/generator 126 is coupled to the first sun gear 130. The first planet carrier 129 is a grounded member. The first ring gear 128 is coupled to the second sun gear 134. The second planet carrier 133 is coupled to a first brake 139. The second sun gear 134 is coupled to the third sun gear 138. The third planet carrier 137 is coupled to a second brake 140. The second ring gear 132 is coupled to the third ring gear 136. In some embodiments, a rotational power is transmitted in and out of the drivetrain 125 through the third ring gear 136.

Figure 4:
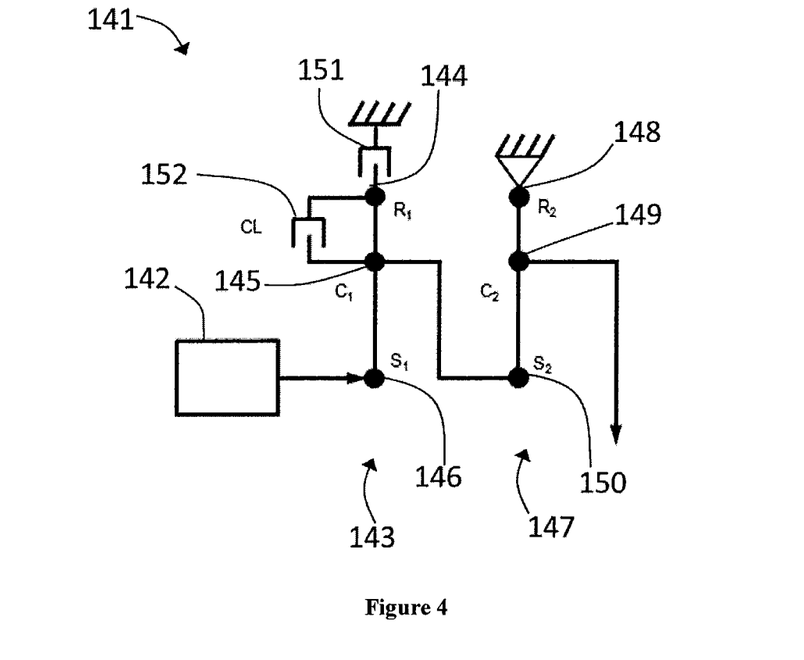
FIG. 4 is a schematic diagram of an electric drivetrain having a motor/generator, two planetary gear sets, a clutch, and a brake.

FIG. 4 depicts one embodiment of an electric drivetrain 141 optionally used in the embodiments of electric axles disclosed herein. The drivetrain 141 includes a motor/generator 142 and a first planetary gear set 143 having a first ring gear 144, a first planet carrier 145, and a first sun gear 146. The drivetrain 141 includes a second planetary gear set 147 having a second ring gear 148, a second planet carrier 149, and a second sun gear 150. In some embodiments, the motor/generator 142 is coupled to the first sun gear 146. The first planet carrier 145 is coupled to the second sun gear 150. In some embodiments, the first planet carrier 145 is operably coupled to the first ring gear 144 through a clutch 152. The first ring gear 144 is coupled to a brake 151. The second ring gear 148 is a grounded member. In some embodiments, a rotational power is transmitted in and out of the drivetrain 141 through the second planet carrier 149.

Figure 5:
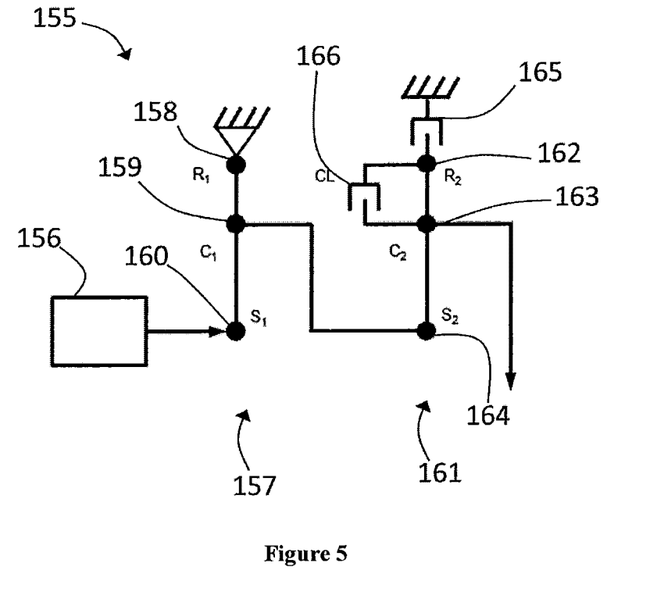
FIG. 5 is a schematic diagram of another electric drivetrain having a motor/generator, two planetary gear sets, a clutch, and a brake.

FIG. 5 depicts one embodiment of an electric drivetrain 155 optionally used in the embodiments of electric axles disclosed herein. The drivetrain 155 includes a motor/generator 156 and a first planetary gear set 157 having a first ring gear 158, a first planet carrier 159, and a first sun gear 160. The drivetrain 155 includes a second planetary gear set 161 having a second ring gear 162, a second planet carrier 163, and a second sun gear 164. In some embodiments, the motor/generator 156 is coupled to the first sun gear 160. The first planet carrier 159 is coupled to the second sun gear 164. In some embodiments, the second planet carrier 163 is operably coupled to the second ring gear 162 through a clutch 166. The second ring gear 162 is coupled to a brake 165. The first ring gear 158 is a grounded member. In some embodiments, a rotational power is transmitted in and out of the drivetrain 155 through the second planet carrier 163.

Figure 6:
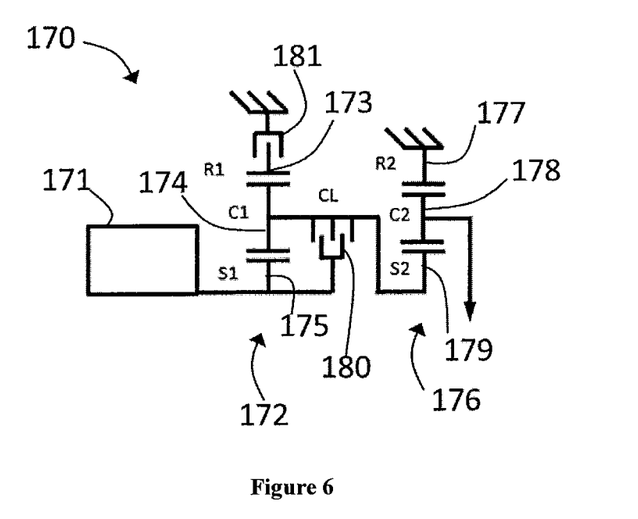
FIG. 6 is a schematic diagram of an electric drivetrain having a motor/generator, two planetary gear sets, a clutch, and a brake.

FIG. 6 depicts one embodiment of an electric drivetrain 170 optionally used in the embodiments of electric axles disclosed herein. The drivetrain 170 includes a motor/generator 171 and a first planetary gear set 172 having a first ring gear 173, a first planet carrier 174, and a first sun gear 175. The drivetrain 170 includes a second planetary gear set 176 having a second ring gear 177, a second planet carrier 178, and a second sun gear 179. In some embodiments, the motor/generator 171 is coupled to the first sun gear 175. The first planet carrier 174 is coupled to the second sun gear 179. In some embodiments, the first sun gear 175 is coupled to the second sun gear 179 through a clutch 180. In some embodiments, the first ring gear 173 is coupled to a brake 181. The second ring gear 177 is a grounded member. In some embodiments, a rotational power is transmitted in and out of the drivetrain 170 through the second planet carrier 178.

Figure 7:
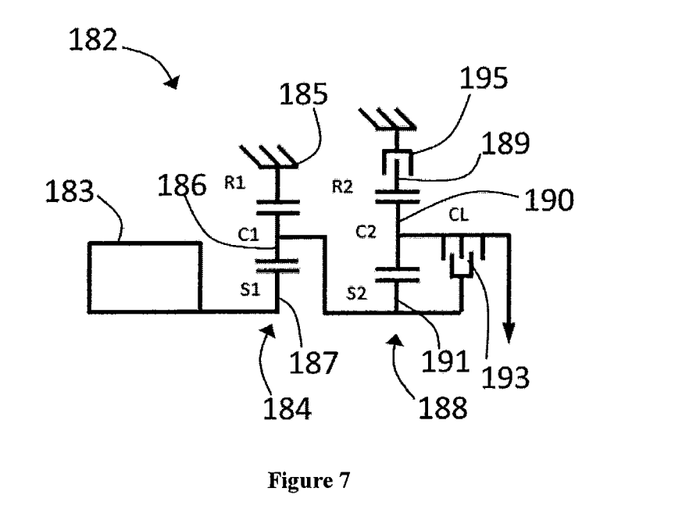
FIG. 7 is a schematic diagram of another electric drivetrain having a motor/generator, two planetary gear sets, and a clutch.

FIG. 7 depicts one embodiment of an electric drivetrain 182 optionally used in the embodiments of electric axles disclosed herein. The drivetrain 182 includes a motor/generator 183 and a first planetary gear set 184 having a first ring gear 185, a first planet carrier 186, and a first sun gear 187. The drivetrain 182 includes a second planetary gear set 188 having a second ring gear 189, a second planet carrier 190, and a second sun gear 191. In some embodiments, the motor/generator 183 is coupled to the first sun gear 187. The first planet carrier 186 is coupled to the second sun gear 191. In some embodiments, the second ring gear 189 is coupled to a brake 192. The first ring gear 185 is a grounded member. In some embodiments, the second planet carrier 190 is operably coupled to the second sun gear 191 through a clutch 193. In some embodiments, a rotational power is transmitted in and out of the drivetrain 182 through the second planet carrier 190.

Figure 8:
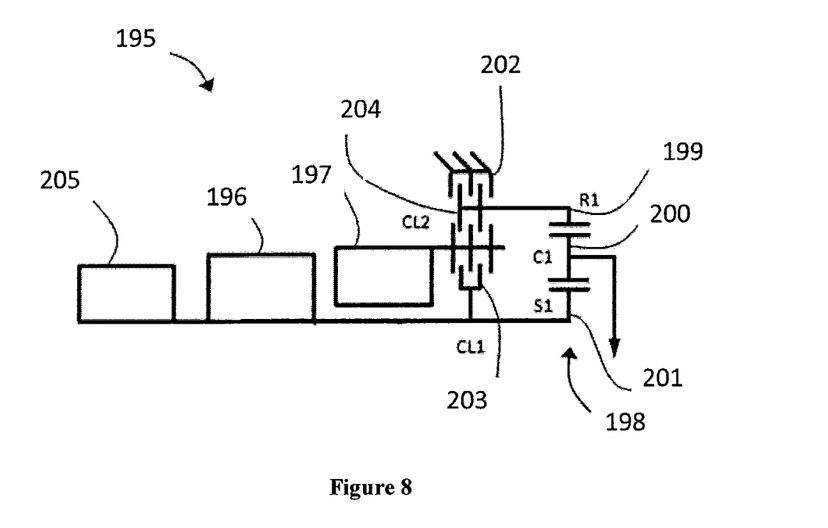
FIG. 8 is a schematic diagram of an electric drivetrain having two motor/generators, a planetary gear set, two clutches, a one-way clutch, and a brake.

FIG. 8 depicts one embodiment of an electric drivetrain 195 optionally used in the embodiments of electric axles disclosed herein. The drivetrain 195 includes a first motor/generator 196, a second motor/generator 197, and a planetary gear set 198 having a ring gear 199, a planet carrier 200, and a sun gear 201. In some embodiments, the drivetrain 195 includes a brake 202, a first clutch 203, and a second clutch 204. In some embodiments, the drivetrain 195 includes a one way clutch 205 coupled to the first motor/generator 196. The first clutch 203 is coupled to the first motor/generator 196 and the second motor/generator 197. The sun gear 201 is coupled to the first motor/generator 196. The second clutch 204 is coupled to the brake 202, the second motor/generator 197, and the ring gear 199. The planet carrier 200 is coupled to the sun gear 201. In some embodiments, a rotational power is transmitted in and out of the drivetrain 195 through the planet carrier 200.

Figure 9:
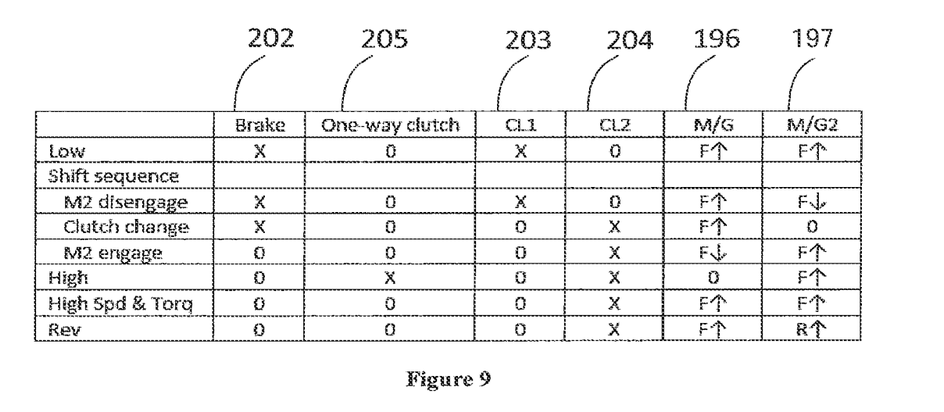
FIG. 9 is a table depicting operating modes of the drivetrain of FIG. 8.

Turning now to FIG. 9, in some embodiments, the drivetrain 195 is optionally operated in multiple modes. For example, a low mode of operation corresponds to an engaged condition of the brake 202 and the first clutch 203 and the first and second motor/generators 196, 197 having a positive power output. A shift mode of operation corresponds to an engaged condition of the brake 202 and the first clutch 203 while reducing the second motor/generator output 197. A mode of operation having the second motor/generator 197 power output corresponds to an engaged condition of the brake 202 while the first clutch 203 disengages and the second clutch 204 disengages. A mode of operation having the second motor/generator 197 engaged while reducing the first motor/generator output corresponds to an engaged condition of the second clutch 204 while the brake 202 and the first clutch 203 are disengaged. A high mode of operation corresponds to the one-way clutch 205 engaged along with the second clutch 204 while the brake 202 and the first clutch 203 are disengaged. A high speed and torque mode of operation corresponds to an engaged second clutch 204 while the brake 202 and the first clutch 203 are disengaged and the first and second motor/generators 196, 197 have positive power output. A reverse mode of operation corresponds to an engaged second clutch 204 while the brake 202 and the first clutch 203 are disengaged and the second motor/generator 197 has positive power output and the first motor/generator 196 in regeneration.

Figure 10:
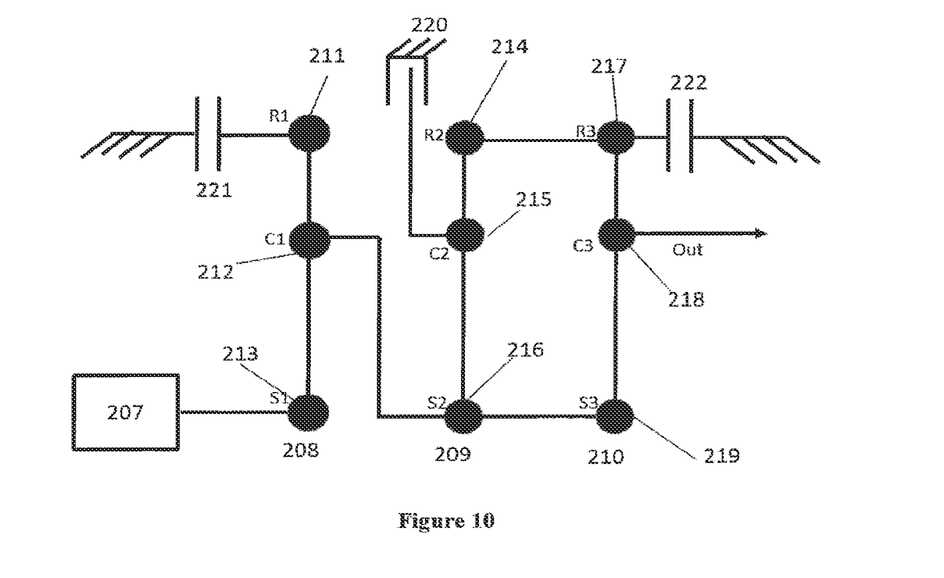
FIG. 10 is a schematic diagram of an electric drivetrain having a motor/generator, three planetary gear sets, two clutches and a brake.

FIG. 10 depicts one embodiment of an electric drivetrain 206 optionally used in the embodiments of electric axles disclosed herein. The drivetrain 206 includes a first motor/generator 207, and a first planetary gear set 208, a second planetary gear set 209 and a third planetary gear set 210. The first planetary gear set 208 has a ring gear 211, a planet carrier 212, and a sun gear 213. The second planetary gear set 209 has a ring gear 214, a planet carrier 215, and a sun gear 216. The third planetary gear set 210 has a ring gear 217, a planet carrier 218, and a sun gear 219. In some embodiments, the drivetrain 206 includes a brake 220, a first clutch 221, and a second clutch 222. In some embodiments, the first clutch 221 is coupled to the ring gear 211 of the first planetary gear set and grounded. The second clutch 222 is coupled to the ring gear 217 of the third planetary gear set and grounded. The sun gear 213 is coupled to the first motor/generator 207. The planet carrier 212 of the first planetary gear set is connected to the sun gear 216 of the second planetary gear set. The ring gear 214 of the second planetary gear set is connected to the ring gear 217 of the third planetary gear set. The sun gear 219 of the third planetary gear set is connected to the sun gear 216 of the second planetary gear set. The planet carrier 215 of the second planetary gear set is coupled to the brake 220. In some embodiments, a rotational power is transmitted in and out of the drivetrain 206 through the planet carrier 218 of the third planetary gear set.

The drivetrain 206 is optionally operated in multiple modes. For example, a first mode of operation corresponds to an engaged condition of the brake 220 and the first clutch 221 and disengaged second clutch 222. A second mode of operation corresponds to an engaged condition of the second clutch 222 and the first clutch 221 and the brake disengaged. A neutral mode of operation corresponds to the brake 220 and the first clutch 221 being disengaged.

Figure 11:
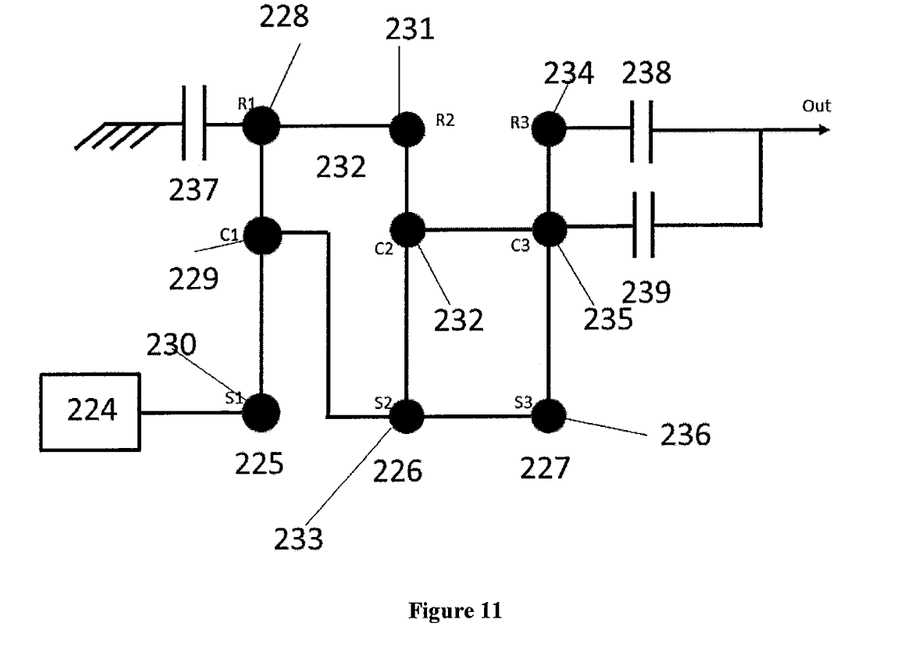
FIG. 11 is a schematic diagram of an electric drivetrain having a motor/generator, three planetary gear sets, three clutches, and a brake.

FIG. 11 depicts one embodiment of an electric drivetrain 223 optionally used in the embodiments of electric axles disclosed herein. The drivetrain 223 includes a first motor/generator 224, and a first planetary gear set 225, a second planetary gear set 226 and a third planetary gear set 227. The first planetary gear set 225 has a ring gear 228, a planet carrier 229, and a sun gear 230. The second planetary gear set 226 has a ring gear 231, a planet carrier 232, and a sun gear 233. The third planetary gear set 227 has a ring gear 234, a planet carrier 235 and a sun gear 236. In some embodiments, the drivetrain 223 includes a first clutch 237, a second clutch 238 and a third clutch 239. In some embodiments, the first clutch 237 is coupled to the ring gear 228 of the first planetary gear set and grounded. The second clutch 238 is coupled to the ring gear 234 of the third planetary gear set 227. The sun gear 230 is coupled to the first motor/generator 224. The planet carrier 229 of the first planetary gear set is connected to the sun gear 233 of the second planetary gear set. The ring gear 231 of the second planetary gear set is connected to the ring gear 228 of the first planetary gear set. The sun gear 236 of the third planetary gear set is connected to the sun gear 233 of the second planetary gear set. The planet carrier 232 of the second planetary gear set is coupled to the planet carrier 235 of the third planetary gear set. The third clutch 239 is coupled to the planet carrier 235 of the third planetary gear set. In some embodiments, a rotational power is transmitted in and out of the drivetrain 223 through the planet carrier 235 and the ring gear 234 of the third planetary gear set.

The drivetrain 223 is optionally operated in multiple modes. For example, a first mode of operation corresponds to an engaged condition of the first clutch 237 and the second clutch 238 and the third clutch 239 disengaged. A second mode of operation corresponds to an engaged condition of the third clutch 239 and the first clutch 237 and the second clutch 238 disengaged. A neutral mode of operation corresponds to the first clutch 237, the second clutch 238 and the third clutch 239 being disengaged.

It should be noted that the battery is capable of being not just a high voltage pack such as lithium ion or lead-acid batteries, but also ultracapacitors or other pneumatic/hydraulic systems such as accumulators, or other forms of energy storage systems. The motor/generators described herein are capable of representing hydromotors actuated by variable displacement pumps, electric machines, or any other form of rotary power such as pneumatic motors driven by pneumatic pumps. The electric axle powertrain architectures depicted in the figures and described in text is capable of being extended to create a hydro-mechanical architecture as well for hydraulic hybrid systems.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions are to be considered limiting on the preferred embodiments, except in so far as any one claim makes a specified dimension, or range of thereof, a feature of the claim.

While the preferred embodiments have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments described herein are capable of being employed in practicing the preferred embodiments. It is intended that the following claims define the scope of the invention and that methods and structures within the scope of these claims and their equivalents be covered thereby.

What is claimed is:

1. An electric axle powertrain comprising:
an electric drivetrain comprising a first motor/generator and a second motor/generator;
a first planetary gear set operably coupled to the second motor/generator, and the first planetary gear set comprising a first ring gear, a first planet carrier, and a first sun gear, and the first sun gear coupled to the first motor/generator;
a first brake;
a first clutch, a second clutch, and a one-way clutch, wherein the first clutch and the first brake are in an engaged position in a low mode, the one-way clutch and the second clutch are an engaged position while the first brake and the first clutch are in a disengaged position in a high mode, and the second clutch is in the engaged position while the first brake and the first clutch are in the disengaged position in a high speed and torque mode;
a drive wheel axle coupled to the first planet carrier such that power is transmitted out of the drivetrain via the planet carrier; and
a first wheel and a second wheel coupled to the drive wheel axle.

2. The electric axle of claim 1, wherein the motor/generator is coupled to the first sun gear, and the second clutch coupled to the first brake, the second motor/generator, and the first ring gear.

3. The electric axle of claim 2, wherein the first brake is coupled to the second clutch, and the second clutch coupled to the second motor/generator and the first ring gear.

4. The electric axle of claim 1, wherein the first motor/generator is coupled to the first sun gear and the one-way clutch.

5. The electric axle of claim 4, wherein the second ring gear is coupled to the third ring gear.

6. The electric axle of claim 1, wherein the first clutch engages the first motor/generator and the second motor/generator in the engaged positon.

7. The electric axle of claim 1, wherein a shift sequence transitions from a first state where the first clutch is in the engaged position, the second clutch is in the disengaged position, the first motor/generator having a positive power output, and the second motor/generator having a reduced power output to a second state where the first clutch is in the disengaged position, the second clutch is in the engaged position, the first motor/generator having a reduced power output, and the second motor/generator having a positive power output.

8. An electric axle powertrain comprising:
a first motor/generator and a second motor/generator,
a planetary gear set operably coupled to the second motor/generator, the planetary gear set comprising a first ring gear, a first planet carrier, and a first sun gear;
a first clutch adapted to selectively couple the first motor/generator and the second motor/generator, and a second clutch adapted to selectively couple the second motor/generator and the first ring gear;
a first brake coupled to the first ring gear and the second clutch;
a drive wheel axle operably coupled to the continuously variable electric drivetrain; and
a first wheel and a second wheel coupled to the drive wheel axle;
in a high speed and torque mode, the second clutch is in the engaged position while the first brake and the first clutch are in the disengaged position.

9. The electric axle of claim 8, wherein the second motor/generator is coupled to the first sun gear.

10. The electric axle of claim 8, further comprising a one-way clutch coupled to the first motor/generator.

11. The electric axle of claim 8, wherein the first clutch and the first brake are in an engaged position in a low mode.

12. The electric axle of claim 8, further comprising a one-way clutch, and wherein the one-way clutch and the second clutch are an engaged position while the first brake and the first clutch are in a disengaged position in a high mode.

13. The electric axle of claim 8, wherein a shift sequence transitions from a first state where the first clutch is in the engaged position, the second clutch is in the disengaged position, the first motor/generator having a positive power output, and the second motor/generator having a reduced power output to a second state where the first clutch is in the disengaged position, the second clutch is in the engaged position, the first motor/generator having a reduced power output, and the second motor/generator having a positive power output.

14. The electric axle of claim 13, wherein an intermediate state between the first and second states comprises the first clutch in a disengaged position, the second clutch in the engaged position, the first motor/generator having a positive power output, and the first brake engaging the second motor/generator.

* * * * *